United States Patent
Wall et al.

(10) Patent No.: US 7,160,606 B2
(45) Date of Patent: Jan. 9, 2007

(54) METHOD OF TREATING BUILDING MATERIALS WITH BORON AND BUILDING MATERIALS

(75) Inventors: Wesley James Wall, Edmonton (CA); Calvin Lee Michael Wall, Edmonton (CA); Ryan George Smart, Edmonton (CA)

(73) Assignee: Genics Inc., Acheson (CA)

( * ) Notice: Subject to any disclaimer, the term of this patent is extended or adjusted under 35 U.S.C. 154(b) by 45 days.

(21) Appl. No.: 10/489,812

(22) PCT Filed: Sep. 16, 2002

(86) PCT No.: PCT/CA02/01402

§ 371 (c)(1),
(2), (4) Date: Mar. 17, 2004

(87) PCT Pub. No.: WO03/025303

PCT Pub. Date: Mar. 27, 2003

(65) Prior Publication Data

US 2004/0241486 A1   Dec. 2, 2004

(30) Foreign Application Priority Data

Sep. 17, 2001   (CA) .................................... 2357357

(51) Int. Cl.
*B32B 21/02* (2006.01)
*B32B 21/08* (2006.01)
*B32B 21/10* (2006.01)
*B27K 3/22* (2006.01)
*B27K 5/00* (2006.01)

(52) U.S. Cl. .............. 428/292.4; 428/311.71; 428/541; 428/296.7; 428/297.4; 252/602; 252/607; 106/18.13; 106/18.26; 424/630; 424/631; 424/660; 427/439; 427/440

(58) Field of Classification Search ............... 252/602
See application file for complete search history.

(56) References Cited

U.S. PATENT DOCUMENTS

| | | |
|---|---|---|
| 4,289,680 A | 9/1981 | Kimura |
| 4,661,157 A | 4/1987 | Beauford et al. |
| 4,857,322 A | 8/1989 | Goettsche et al. |
| 4,911,988 A | 3/1990 | Cass et al. |
| 4,929,454 A | 5/1990 | Findlay et al. |
| 5,078,912 A | 1/1992 | Goettsche et al. |
| 5,084,280 A | 1/1992 | West |
| 5,186,947 A | 2/1993 | Goettsche et al. |
| 5,187,194 A | 2/1993 | Goettsche et al. |
| 5,194,323 A | 3/1993 | Savoy |
| 5,207,823 A | 5/1993 | Shiozawa |
| 5,224,315 A | 7/1993 | Winter, IV |
| 5,304,237 A | 4/1994 | Barth et al. |
| 5,342,438 A | 8/1994 | West |
| 5,426,121 A | 6/1995 | Bell |

(Continued)

FOREIGN PATENT DOCUMENTS

WO    WO 99/43476 A1    9/1999

*Primary Examiner*—Joseph D. Anthony
(74) *Attorney, Agent, or Firm*—Christensen O'Connor Johnson Kindness PLLC

(57) ABSTRACT

A method of treating building materials with boron and boron treated building materials. The method involves introducing boron during manufacture of the building materials in the form of a water soluble copper-borate complex. The copper-borate complex enables a wider range of glues and adhesives to be used, is slower to leach out, and provides enhanced fungicidal properties.

2 Claims, 2 Drawing Sheets

U.S. PATENT DOCUMENTS

| | | |
|---|---|---|
| 5,444,093 A | 8/1995 | Goettsche et al. |
| 5,478,563 A | 12/1995 | Erami |
| 5,478,598 A | 12/1995 | Shiozawa |
| 5,549,739 A | 8/1996 | Inoue et al. |
| 5,634,967 A | 6/1997 | Williams et al. |
| 5,635,217 A * | 6/1997 | Goettsche et al. .......... 424/632 |
| 5,652,023 A | 7/1997 | Bergervoet et al. |
| 5,763,338 A | 6/1998 | Sean |
| 5,824,370 A | 10/1998 | Bergervoet et al. |
| 5,874,025 A | 2/1999 | Heuer et al. |
| 6,001,279 A | 12/1999 | Payzant et al. |
| 6,110,263 A | 8/2000 | Goettsche et al. |
| 6,113,989 A | 9/2000 | Sinko |
| 6,172,117 B1 | 1/2001 | Bell et al. |
| 6,235,403 B1 | 5/2001 | Vinden et al. |
| 6,352,583 B1 | 3/2002 | Goettsche et al. |
| 6,676,745 B1 * | 1/2004 | Merkley et al. ............. 106/726 |
| 6,777,103 B1 * | 8/2004 | Merkley et al. ............. 428/532 |
| 6,828,275 B1 * | 12/2004 | Uhr et al. ................... 504/139 |
| 2001/0006684 A1 | 7/2001 | Goettsche et al. |
| 2003/0108759 A1 * | 6/2003 | Roos et al. ............... 428/537.1 |
| 2005/0126430 A1 * | 6/2005 | Lightner et al. ......... 106/15.05 |

* cited by examiner

US 7,160,606 B2

METHOD OF TREATING BUILDING MATERIALS WITH BORON AND BUILDING MATERIALS

FIELD OF THE INVENTION

The present invention relates to a method of treating building materials with boron and boron treated building materials.

BACKGROUND OF THE INVENTION

One of the most effective pesticides is boron. An article entitled "Boron Compounds for the preservation of Timber Against Fungi and Insects" by W. P. K. Findlay presented to the 6th Wood Protection Congress of the German Wood Research Association, shows that as early as 1959 the toxicity of boron to fungi and insects was well known. Unfortunately, an inherent drawback with the use of boron is that the bonding strength of many glues and adhesives are adversely affected when boron is present. This loss of bonding strength is mentioned in the Findlay reference and also in subsequent papers such as the paper entitled "The Effect of Ethylene Glycol and Sodium Borate Solutions on the Adhesion of Epoxy to White Oak and White Pine Samples" by Dan Freel, Chris Maples, Bruce Neiderer, William T. (Chip) Reynolds and James R. Watson published by the National Maritime Museum Association in 1997. The bonding strength problem provides an obstacle in the cost effective manufacture of boron treated building materials, as only selected glues and adhesives can be used. It also can affect what glues and adhesives can be used with the building materials after manufacture.

SUMMARY OF THE INVENTION

What is required is a method of treating building materials with boron that can be used with a wider range of glues and adhesives without adversely affecting bonding strength.

According to one aspect of the present invention there is provided a method of treating building materials with boron, comprising the step of introducing boron during manufacture of the building materials in the form of a water soluble copper-borate complex.

According to another aspect of the present invention there is provided boron treated building materials, the building materials being treated during manufacture with a water soluble copper-borate complex.

U.S. Pat. No. 6,001,279 (Payzant et al) discloses a method of making a solidified water soluble wood preservative which contains both copper and boron. During laboratory tests a first surprising discovery has been made. It was discovered that a chemical change had occurred to the copper and boron forming a copper-borate complex. During tests with building products a second surprising discovery was made. It was discovered that when boron is present in a copper-borate complex, the copper-borate complex appears to mask the presence of the boron. This enables a far wider range of glues and adhesives to be used. In some cases, the copper-borate complex served to strengthen the adhesive bond.

Boron is not without its limitations. These limitations have been the subject of much study. In his research Findlay determined that the possible loss of boron through leaching when placed in wet environments for long periods. This was not felt to be a significant problem in most applications. In their paper entitled "Integrated Protection Against Lyctid Beetle Infestations—Resistance of Boron-treated Wood" in a February 1987 publication by the Forest Products Research Society, Lonnie H. Williams and Terry L. Amburgey determined that boron treatment did not protect against mold fungi or soft-rot decay fungi. This combination of draw backs becomes more significant when considered in light of an article entitled "An Assessment of Mold Contamination Problems in Atlantic Canada Schools: Mold Burdens, Amplifying Sites and Benefits of Proactive School Inspection Policies" by Thomas G. Rand of the Department of Biology of Saint Mary's University of Halifax, Nova Scotia. Dr. Rand studied mold species and, in particular, environments that supported toxigenic fungi. It was determined that toxigenic fungi were found where there was building material deterioration due to on going water infiltration and condensation problems. He determined that the highest spore loads were to be found in non-occupancy spaces in ceiling plenums, basements, crawl spaces and peripheral wall cavities. He determined that the mold species assemblage was quantitatively and qualitatively dissimilar to that encountered outdoors and in "normal" school environments. The occupants of the schools that Dr. Rand studied experienced health problems consistent with exposure to molds, including: upper respiratory problems, runny noses, headaches, rashes, and nose-bleeds. From a review of the above referenced literature, it appears that boron treatment would be ineffective in treating the toxigenic fungi problem identified in Dr. Rand's research.

The benefit of using a copper-borate complex, as proposed, is that the presence of copper slows the leaching of boron and copper has known fungicidal properties.

BRIEF DESCRIPTION OF THE DRAWINGS

These and other features of the invention will become more apparent from the following description in which reference is made to the appended drawings., the drawings are for the purpose of illustration only and are not intended to in any way limit the scope of the invention to the particular embodiment or embodiments shown, wherein.

DETAILED DESCRIPTION OF THE PREFERRED EMBODIMENT

The preferred method of treating building materials with boron will now be described with reference to FIG. 1.

The method of treating building materials with boron involves the step of introducing boron during manufacture of the building materials in the form of a water soluble copper-borate complex. The manner of forming a water soluble copper-borate complex is outlined in U.S. Pat. No. 6,001,279.

In order to test the efficacy of the method, some water soluble copper-borate complex was introduced into waferboard (also known as Oriented Strand Board or OSB) during the manufacturing process. This waferboard was then tested for strength by the Alberta Research Council and tested for mold resistance by Forintek Canada Corporation. The copper-borate complex was prepared in accordance with the teachings of U.S. Pat. No. 6,001,279. The copper borate complex was then crushed and introduced. It was found that a crush of random sizes left mold pockets, so it is preferable that a fine crush of around 200 mesh be used to ensure uniform distribution.

Figure 1:
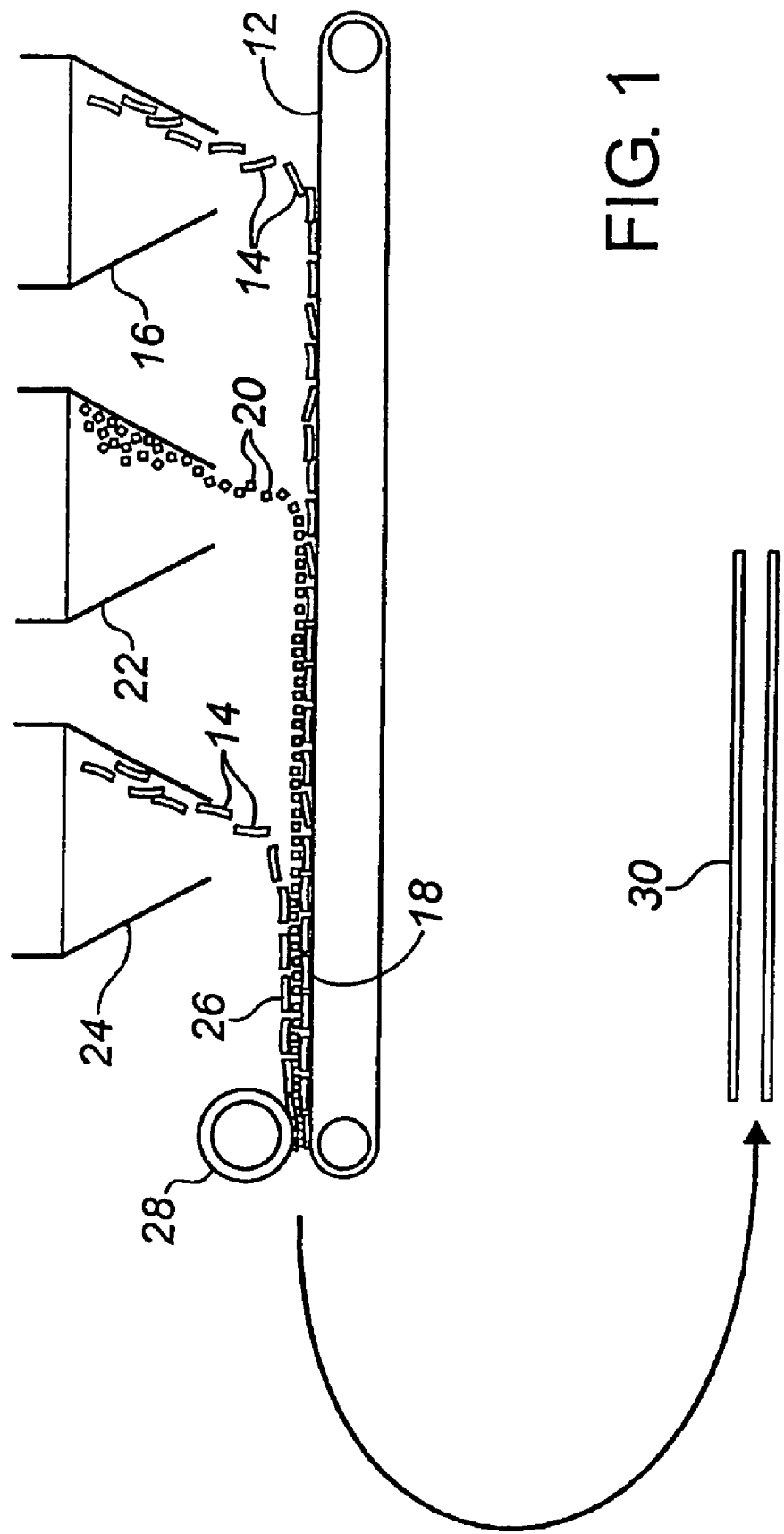
FIG. 1 is a flow diagram illustrating the steps in the preferred method of treating building materials with boron.

Referring to FIG. 1, there is illustrated a moving conveyor 12. During the process of manufacturing the waferboard, wafer chips 14 mixed with adhesive (not shown) were deposited onto moving conveyor 12 from a first hopper 16 to form a lower layer 18. Crush particles 20 of copper-borate complex from a second hopper 22 were then introduced onto lower layer 18. More wafer chips 14 mixed with adhesive (not shown) were then deposited onto lower layer 18 from a third hopper 24 to form an upper layer 26. Upper layer 26 and lower layer 18 were then compressed together by roller 28 to form a waferboard 30 containing copper-borate complex.

Waferboard 30 was then subjected to strength tests by the Alberta Research Council, the results of which are set forth in the follow tables:

TABLE 1

Internal Bond
(0437.1-93)

| Client: | Tolko/Genics | Test Material: | Waferboard, Random |
|---|---|---|---|
| Test Date: | Nov. 25, 2000 | Nom. Thickness: | 7/16 in–11.0 mm |
| Proj. Ref.: | 1088028 | Conditioning: | As Received |

| Panel No. | Sample Number | Sample Length mm | Sample Width mm | Sample Thick. mm | Sample Weight g | Sample Density kg/m$^3$ | Max. Load N | Internal Bond Strength MPa | Avg. For Panel MPa | Location of Break |
|---|---|---|---|---|---|---|---|---|---|---|
| Y-1 | 1 | 50.4 | 50.4 | 11.12 | 17.5 | 620 | 778 | 0.306 | | 3 |
| | 2 | 50.4 | 50.4 | 11.08 | 17.0 | 604 | 1033 | 0.407 | | 3 |
| | 3 | 50.4 | 50.4 | 11.22 | 16.5 | 579 | 827 | 0.326 | 0.347 | 3 |
| | 4 | 50.2 | 50.4 | 11.24 | 17.8 | 626 | 981 | 0.388 | | 3 |
| | 5 | 50.2 | 50.4 | 11.26 | 18.9 | 663 | 1082 | 0.428 | | 3 |
| | 6 | 50.2 | 50.4 | 11.18 | 16.6 | 587 | 579 | 0.229 | | 3 |
| No. | 6 | 6 | 6 | 6 | 6 | 6 | 6 | 6 | | 1 |
| Avg. | | 50.3 | 50.4 | 11.18 | 17.4 | 613 | 880 | 0.347 | | 0.347 |
| S.D. | | 0.11 | 0.00 | 0.071 | 0.90 | 30.6 | 188.8 | 0.075 | | |
| C.V. | | 0.22% | 0.00% | 0.63% | 5.16% | 4.99% | 21.45% | 21.48% | | |

TABLE 2

Internal Bond
(0437.1-93)

| Client: | Tolko/Genics | Test Material: | Waferboard, Random |
|---|---|---|---|
| Test Date: | Nov. 25, 2000 | Nom. Thickness: | 7/16 in–11.0 mm |
| Proj. Ref.: | 1088028 | Conditioning: | As Received |

| Panel No. | Sample Number | Sample Length in | Sample Width in | Sample Thick. in | Sample Weight lb | Sample Density lb/ft$^3$ | Max. Load lbf | Internal Bond Strength psi | Avg. For Panel psi | Location of Break |
|---|---|---|---|---|---|---|---|---|---|---|
| Y-1 | 1 | 1.98 | 1.98 | 0.438 | 0.0385 | 38.7 | 174.9 | 44.4 | | 3 |
| | 2 | 1.98 | 1.98 | 0.436 | 0.0374 | 37.7 | 232.2 | 59.0 | | 3 |
| | 3 | 1.98 | 1.98 | 0.442 | 0.0363 | 36.1 | 185.9 | 47.2 | 50.3 | 3 |
| | 4 | 1.98 | 1.98 | 0.443 | 0.0392 | 39.1 | 220.5 | 56.2 | | 3 |
| | 5 | 1.98 | 1.98 | 0.443 | 0.0416 | 41.4 | 243.2 | 62.0 | | 3 |
| | 6 | 1.98 | 1.98 | 0.440 | 0.0366 | 36.6 | 130.2 | 33.2 | | 3 |
| No. | 6 | 6 | 6 | 6 | 6 | 6 | 6 | 6 | | 1 |
| Avg | | 1.98 | 1.98 | 0.440 | 0.0383 | 38.3 | 197.8 | 50.3 | | 50.3 |
| S.D. | | 0.004 | 0.000 | 0.003 | 0.002 | 1.91 | 42.44 | 10.82 | | |
| C.V. | | 0.22% | 0.00% | 0.63% | 5.16% | 4.99% | 21.45% | 21.48% | | |

TABLE 3

SUMMARY TABLE
GRADE PROPERTIES
(0437.0-93)

| Client: | Tolko/Genics | | | | | | | | | Test Material: | Waferboard, Random | | | |
|---|---|---|---|---|---|---|---|---|---|---|---|---|---|---|
| Test Date: | Apr. 18, 2001 | | | | | | | | | Nom. Thickness: | 11.0 mm–7/16 in | | | |
| Proj. Ref.: | 1088029 | | | | | | | | | Conditioning: | As Per Test Requirement | | | |

| Group 1 | Units | (0437.1-93) R-1 Dir'n | Group Number | | | | | | | | | | | |
|---|---|---|---|---|---|---|---|---|---|---|---|---|---|---|
| | | Requirement | 1 | 2 | 3 | 4 | 5 | 6 | 7 | 8 | 9 | 10 | 11 | 12 | 13 |
| Internal bond | MPa | 0.345 | 0.486 | 0.520 | 0.246 | 0.354 | 0.372 | 0.372 | 0.386 | 0.387 | 0.370 | 0.454 | 0.546 | 0.637 | 0.531 |
| Thickness swell 24 h soak | % | 15.0 | 16.5 | 13.1 | 17.3 | 19.8 | 18.7 | 20.1 | 18.1 | 16.5 | 19.0 | 16.8 | 16.2 | 11.9 | 10.8 |
| Edge Swell 24 h soak | % | N/A | 27.1 | 25.1 | 28.5 | 32.4 | 31.6 | 32.2 | 31.7 | 28.8 | 30.7 | 27.0 | 26.9 | 24.0 | 22.5 |
| Water Absorption 24 h soak | % | N/A | 33.7 | 25.0 | 33.9 | 37.9 | 37.4 | 40.2 | 35.9 | 34.5 | 38.3 | 37.5 | 31.2 | 23.9 | 23.4 |

TABLE 4

SUMMARY TABLE
GRADE PROPERTIES
(0437.0-93)

| Client: | Tolko/Genics | | | | | | | | | Test Material: | Waferboard, Random | | | |
|---|---|---|---|---|---|---|---|---|---|---|---|---|---|---|
| Test Date: | Apr. 18, 2001 | | | | | | | | | Nom. Thickness: | 11.0 mm–7/16 in | | | |
| Proj. Ref.: | 1088029 | | | | | | | | | Conditioning: | As Per Test Requirement | | | |

| Group 1 | Units | (0437.1-93) R-1 Dir'n | Group Number | | | | | | | | | | | |
|---|---|---|---|---|---|---|---|---|---|---|---|---|---|---|
| | | Requirement | 1 | 2 | 3 | 4 | 5 | 6 | 7 | 8 | 9 | 10 | 11 | 12 | 13 |
| Internal bond | psi | 50.0 | 70.5 | 75.4 | 35.7 | 51.3 | 53.9 | 54.0 | 55.9 | 56.2 | 53.6 | 65.8 | 79.1 | 92.4 | 77.0 |
| Thickness swell 24 h soak | % | 15.0 | 16.5 | 13.1 | 17.3 | 19.8 | 18.7 | 20.1 | 18.1 | 16.5 | 19.0 | 16.8 | 16.2 | 11.9 | 10.8 |
| Edge Swell & 24 h soak | % | N/A | 27.1 | 25.1 | 28.5 | 32.4 | 31.6 | 32.2 | 31.7 | 28.8 | 30.7 | 27.0 | 26.9 | 24.0 | 22.5 |
| Water Absorption 24 h soak | % | N/A | 33.7 | 25.0 | 33.9 | 37.9 | 37.4 | 40.2 | 35.9 | 34.5 | 38.3 | 37.5 | 31.2 | 23.9 | 23.4 |

Waferboard 30 was then subjected to mold resistance tests by Forintek Canada Corp.

SUMMARY

Concerns have recently been raised regarding the susceptibility of building sheathing products to fungal growth if water were to penetrate wall systems and remain in the wall cavity for extended periods. Genics Inc. approached Forintek to investigate the resistance of their OSB panel product containing copper/borate to moulds. This report describes the method and results of investigating resistance of the copper/borate OSB panel product to surface colonization by moulds under ideal conditions for mould growth.

After four weeks of exposure in an environmental chamber, OSB samples containing copper/borate, at each of the three copper/borate ratios, and anhydrous boric oxide at the higher of two levels tested, showed similarly high resistance to mould growth. The untreated OSB panels, zinc-borate treated panel products, and Douglas fir plywood showed similarly low resistance to mould growth. A dose/response effect was apparent for the copper/borate and anhydrous boric oxide products.

1 Objectives

The purpose of this test was to evaluate, in an environmental chamber, the mould resistance of OSB panels containing copper/borate compared to OSB panels containing no additive, OSB panels containing anhydrous boric oxide, OSB panels and an OSB tongue and groove flooring product containing zinc-borate, and Douglas fir plywood.

2 Introduction

Concerns have recently been raised regarding the susceptibility of building sheathing products to fungal growth if water were to penetrate wall systems and remain in the wall cavity for extended periods. Genics Inc. approached Forintek to investigate the resistance of their OSB panel product containing copper/borate to moulds. This report describes the method and results of investigating resistance of the copper/borate OSB panel product to surface colonization by moulds under ideal conditions for mould growth.

This method uses controlled temperature and humidity conditions in a small environmental chamber to evaluate resistance of sample surfaces to growth of a broad range of moulds from both natural and artificial inoculum. The ASTM standard D3273-94' was followed with the exception that the chamber temperature was maintained at 25° C. rather than the 32.5° C. specified.

3 Staff

Paul Morris Group Leader, Durability & Protection Group
Dave Minchin Wood Protection Technologist
Shane McFarling Wood Preservation Process Technologist
Janet Ingram Wood Preservation Technologist

4 Materials and Method

4.1 Test Material

The copper/borate containing OSB panels, anhydrous boric oxide containing OSB panels, and the OSB with no additives were manufactured by the Alberta Research Council (ARC) on behalf of Genics Inc. The panels containing one of the three target copper/borate ratios (2.9%, 5% and 10% boric acid equivalent (BAE)) or one of two levels of anhydrous boric oxide, and the untreated OSB panels were marked with codes according to treatment or product and shipped to Forintek. Two panel products (OSB sheathing and OSB tongue and groove flooring) containing zinc-borate were obtained by Genics and shipped to Forintek. The treatment levels, treatment/product codes, and panel thickness of the OSB products and plywood tested are summarized in Table 1.

TABLE 1

Test Products and Analyzed Borate Content

| PANEL TYPE | ACTUAL THICKNESS (MM) | # OF PANELS SUPPLIED | ANALYZED BORATE CONTENT (% BAE)* | COMMENTS |
|---|---|---|---|---|
| OSB - no additive | 11 | 3 | NA | Control |
| OSB - Genics 2.9% Cu | 11 | 3 | 0.88 (0.25) | |
| OSB - Genics 5% Cu | 11 | 3 | 0.98 (0.26) | |
| OSB - Genics 10% Cu | 11 | 3 | 1.28 (0.31) | |
| OSB - Anhydrous Boric Oxide | 11 | 3 | 0.58 (0.21) | Borate only reference material |
| OSB - Anhydrous Boric Oxide | 11 | 3 | 1.13 (0.21) | |
| T&G - Zinc Borate | 18 | 4 | — | Reference material |
| OSB - Zinc Borate | 12 | 4 | 0.89 (0.09) | Reference material |
| Douglas fir Plywood | 9 | 1 | NA | Plywood control |

*Average with standard deviation shown in parenthesis

All panels provided by Genics and the Douglas-fir plywood were processed at Forintek into test samples for mould resistance and samples for borate analysis. Ten replicates of samples, 100×75 mm, were prepared from panels of each product group for installation in the mould growth chambers:

Where three panels of each product were received (all panels made at ARC—Table 1), three mould resistance samples were cut from each of two panels, and four samples were cut from the third panel for a total of ten samples.

Where four panels of a product were received (zinc-borate products), three samples were cut from each of two panels and two samples were cut from each of the remaining two panels.

All ten Douglas-fir samples were cut from one sheet of plywood.

Fourty-seven analyses samples, 19×19 mm, were cut from panels of each panel product and analyzed for borate content at Forintek using a standard hot water extraction and titration method. Samples for the mould resistance test were allowed to condition at ambient laboratory temperature (about 20° C.) and relative humidity (about 30%) before initial pre-test weights were recorded, except for samples cut from the zinc-borate panels, which were processed and weighed within 24 hours of arrival at Forintek.

4.2 Test Chamber

Mould resistance samples were randomly assigned to one of four environmental chambers. Each chamber (FIG. 1) consisted of a rectangular 114 liter (61×46×46 cm) heavy duty polyethylene tank fitted with a pitched-roof cover made of 6.4 mm thick clear acrylic. The pitch was sufficient to allow condensation to run down the inside surface of the cover instead of dripping on the samples suspended inside the tank.

The bottom of the tank contained about 8 cm of water. A tray with a bottom of stainless steel coarse wire mesh covered with plastic sunscreen fabric supported an 8 cm thick layer of non-sterilized commercial potting soil about 3 cm above the surface of the water. Approximately 5 cm was left between the side of the tray and the tank wall to permit air movement within the tank. A 10 cm diameter fan (Muffin, model MU2A1) positioned at one end of the soil tray circulated air within the chamber over the surface of the soil to aid in the distribution of spores.

Samples were suspended at even spacing, using eye-hooks on one of four plastic support bars spanning the width of the tank. The samples were suspended with the long dimension vertical and parallel to each other so that the faces were perpendicular to the fan air-flow. The lower ends of the samples were about 13 cm above the soil surface.

Heat was applied to each chamber by an immersion heater (Ogden, 300 watt, 120 volt) installed horizontally in the water through one end of the chamber. The heater was controlled by a solid-state electronic temperature controller (Ogden) to maintain a temperature of 25.0±1.0° C. in proximity to the samples, as measured by a thermocouple located amongst the samples. To aid in even heat distribution, water within the tank was constantly stirred by an aquarium circulating pump (Aqua-pump-1, variable flow) set at maximum flow. Lack of chamber ventilation resulted in a constant relative humidity at, or near, 100% inside the chamber. This is confirmed by the constant formation of condensate on the pitched cover.

4.3 Inoculum

The following cultures were inoculated onto 1.5% malt extract, 2% agar (Difco) Petri plates and incubated for 18 days at 32.5° C. to produce inoculum for the test chamber:

| | |
|---|---|
| *Alternaria tenuissima* group (Kunze) Wiltshire 691B | Ftk |
| *Aspergillus niger* v. Tiegh. 6275 | ATCC |
| *Aureobasidium pullulans* (d By) Arnaud 9348 | ATCC |
| *Penicillium citrinum* Thom 9849 | ATCC |

An inoculation suspension was prepared by scraping spores and mycelium from the surface of the incubated plates and mixing in a blender with water for 15 seconds. The suspension volume was adjusted with water to about 1 liter. A 50-ml pipette was used to distribute the inoculum evenly over the soil surfaces in the four chambers. The chamber was operated at test conditions for at least one week before the inoculum was introduced, and was operated at test conditions for at least four weeks after inoculation before the test samples were installed in the chamber. This allowed the fungi to become established in the soil and to produce spores for dispersal to the sample surfaces.

4.4 Assessment

Following two and four weeks exposure within the environmental chamber, samples were removed, weighed, and rated for the extent and intensity of fungal growth on a scale of 0–10, where zero represents no growth and ten represents extensive and intense fungal growth. The rating system places emphasis on surface area covered on the two faces over coverage on edges, and considers degree of discoloration by fungal growth. Sample moisture uptake during the two-week exposure periods was determined from changes in sample weights.

5 Results and Discussion 5.1 Assessment After Two Weeks

Results for ratings of mould growth on samples at two and four weeks are summarised as averages of ten replicates of each panel product in Table 2. Also shown in Table 2 are the moisture uptake determinations expressed as the average percent increase in sample weights from the initial weights recorded before exposure in the chambers.

After two weeks of exposure in the chambers, there was very little mould growth on any of the OSB products containing copper/borate or anhydrous boric oxide, and there was no evidence of a dose/response effect within these products (average ratings of 0.6 to 1.1). Mould growth was more extensive on the untreated control OSB panels (average ratings of 4.8). Mould growth was most extensive on the Douglas fir plywood and the zinc-borate OSB panels and OSB tongue and groove (T&G) flooring products (ratings of 6.1 to 8.1). Most mould growth on all samples appeared as a very light, white or pale green growth most evident when viewed at a low angle across the surface of the sample.

Average percent moisture uptakes were similar for all the Genics OSB panel products, with or without borates, and for Douglas fir plywood (17.9% to 20.7%). Percent moisture uptakes were slightly lower for the zinc-borate panel products (15.4 for the OSB panels and 13.0% for the OSB tongue and groove product). This may be due to the non-conditioned initial weights of the zinc borate treated products.

5.2 Assessment After Four Weeks

Mould growth was more extensive on samples of all panel products after four weeks in the chambers. The least extensive mould growth occurred on the copper/borate samples and the high-level anhydrous boric oxide samples. Average ratings of the copper/borate samples may indicate a dose/response effect with samples of the low to high ratio copper/borate panels as 4.4, 3.3, and 2.5 respectively. The anhydrous boric oxide panels show a strong dose/response with an average rating of the low-level samples of 6.7 and an average rating of the high level samples of 3.0. The control OSB, Douglas-fir plywood, and both zinc-borate treated products had extensive mould growth with average ratings of 9.3, 9.5, 9.5, and 10.0, respectively. Only a few samples displayed intense mould colouration, and this was usually on samples with extensive surface coverage on the faces or on sample edges. The only panel product to consistently exhibit intense growth was the tongue and groove zinc borate product, where growth was particularly extensive relative to all other panel products at both the two and four week assessments.

TABLE 2

Summary of Mould Growth Rating and Percent Moisture Uptake at Two and Four Weeks

| PANEL TYPE | LOADING % BAE | FUNGAL GROWTH RATING AT 2 WEEKS (0–10)* | % MOISTURE UPTAKE AT 2 WEEKS* | FUNGAL GROWTH RATING AT 4 WEEKS (0–10)* | % MOISTURE UPTAKE AT 4 WEEKS* |
|---|---|---|---|---|---|
| Control | 0.00 | 4.8(1.7) | 18.8(0.8) | 9.3(1.3) | 19.6(0.8) |
| Genics 2.9% Cu | 0.88 | 0.8(0.8) | 20.7(0.7) | 4.4(1.3) | 22.4(1.1) |
| Genics 5% Cu | 0.98 | 0.6(0.7) | 20.3(1.0) | 3.3(1.3) | 21.8(1.2) |
| Genics 10% Cu | 1.28 | 0.6(0.7) | 20.0(1.2) | 2.5(1.1) | 21.4(1.0) |
| Anhydrous Boric Oxide | 0.58 | 1.1(0.9) | 18.6(0.9) | 6.7(1.9) | 19.5(0.9) |
| Anhydrous Boric Oxide | 1.13 | 1.1(0.9) | 20.1(0.6) | 3.0(0.9) | 21.2(0.9) |
| D. Fir Plywood | 0.00 | 6.1(1.2) | 17.9(1.8) | 9.5(0.5) | 17.3(1.6) |
| Zinc Borate | 0.89 | 6.4(2.0) | 15.4(0.6) | 9.5(0.7) | 15.7(0.7) |
| Zinc Borate (T&G) | N/A | 8.1(0.9) | 13.0(0.9) | 10.0(0.0) | 14.6(0.7) |

*Mean values with standard deviation shown in parenthesis.

Figure 2:
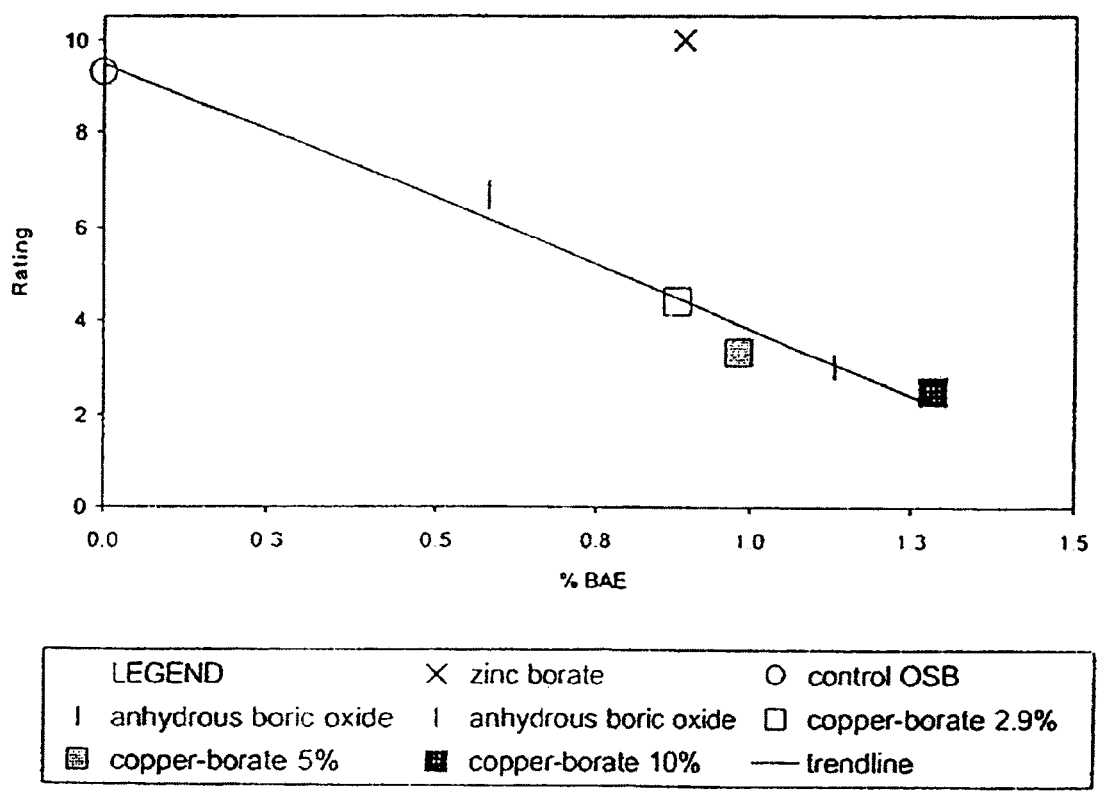
FIG. 2 is a graph correlating boron content with a mould growth rating.

Overall, average ratings of borate-containing products correlate well with the borate content determined by analysis results (FIG. 2), with the exception of the zinc-borate product. This may indicate the importance of borate as the active ingredient in providing mould resistance of the test products. The zinc-borate may not have provided the expected resistance to mould growth due to the unavailability of the borate to the fungi.

There was little additional moisture uptake by any samples between the two and four week assessments, indicating that all panel types absorbed most moisture within the first two weeks in the chambers.

6 Conclusions

After four weeks of exposure in an environment chamber, OSB samples containing copper/borate, at each of the three levels tested, and anhydrous boric oxide at the higher of two levels tested, showed substantial resistance to mould growth.

After four weeks a dose/response effect was apparent for the copper/borate and anhydrous boric oxide products.

After four weeks of exposure in an environmental chamber, the untreated OSB panels, zinc-borate treated panel products, and Douglas fir plywood were not generally resistant to mould growth.

All panel types absorbed most moisture within the first two weeks in the chambers.

In order to not disrupt normal manufacturing procedures the crushed wood preservative was introduced separately. It will be appreciated however, that a plant converting to the use of this type of wood preservative may choose to mix the crushed wood preservative with the adhesive.

The term "building materials" in this application is not intended to be limited to wood building materials. The term is also intended to encompass building materials such as insulation (whether styrofoam, expanded polystyrene, urethane or fibreglass), sheeting material (whether drywall, plaster board, plywood or straw board) and vapour barrier covers.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A method of treating building materials with boron, comprising the steps of:
   introducing boron during manufacture of wood or plant fiber-based composite building materials held together by adhesive, the boron being introduced in the form of a water soluble copper-borate complex in order to reduce adverse effects of the boron on mechanical bonding properties of the adhesive.

2. Building materials treated in accordance with the method set forth in claim 1.

* * * * *